(12) United States Patent
Aggas

(10) Patent No.: US 6,372,312 B1
(45) Date of Patent: Apr. 16, 2002

(54) VACUUM IG UNIT WITH MICRO-SIZED SPACERS

(75) Inventor: Steven L. Aggas, Pinckney, MI (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

(21) Appl. No.: 09/505,782

(22) Filed: Feb. 17, 2000

(51) Int. Cl.⁷ .............................. E06B 3/24; E04C 2/54
(52) U.S. Cl. ........................................ 428/34; 52/786.13
(58) Field of Search ........................ 428/34, 120, 328, 428/702; 52/786.1, 786.13

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 3,990,201 A | 11/1976 | Falbel |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,514,450 A | 4/1985 | Nowobilski et al. |
| 4,683,154 A | 7/1987 | Benson et al. |
| 4,786,344 A | 11/1988 | Beuther |
| 4,824,215 A | 4/1989 | Joseph et al. |
| 4,874,461 A | 10/1989 | Sato et al. |
| 4,924,243 A | 5/1990 | Sato et al. |
| 4,983,429 A | 1/1991 | Takayanagi et al. |
| 5,124,185 A | 6/1992 | Kerr et al. |
| 5,157,893 A | 10/1992 | Benson et al. |
| 5,234,738 A | 8/1993 | Wolf |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,499,128 A | 3/1996 | Hasegawa et al. |
| 5,596,981 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,834,891 A | 11/1998 | Novich |
| 5,855,638 A | 1/1999 | Demars |
| 5,891,536 A | 4/1999 | Collins et al. |
| 5,902,652 A | 5/1999 | Collins |
| 6,049,370 A | 4/2000 | Smith, Jr. et al. |

FOREIGN PATENT DOCUMENTS

| | | |
|---|---|---|
| FR | 2 482 161 | 11/1981 |
| WO | WO 99 57074 | 11/1999 |
| WO | WO 99 57406 | 11/1999 |

OTHER PUBLICATIONS

International Search Report, Jun. 8, 2001.
"Temperature–Induced Stresses in Vacuum Glasing: Modelling and Experimental Validation," T.M. Simko et al, *Solar Energy*, Vo. 63, No. 1, pp. 1–21 (1998).

*Primary Examiner*—Donald J. Loney
(74) *Attorney, Agent, or Firm*—Nixon & Vanderhye P.C.

(57) ABSTRACT

A vacuum insulating glass (IG) unit. In certain embodiments, single crystal spacers (e.g., of aluminum oxide) are provided between opposing substrates so as to maintain a low pressure space therebetween. The single crystal nature of the spacers enables them to be small enough so that they are not visibly obtrusive, and yet strong enough to maintain the low pressure space. In certain embodiments, the spacers may be of a hexagonal platelet shape.

7 Claims, 3 Drawing Sheets

VACUUM IG UNIT WITH MICRO-SIZED SPACERS

This invention relates to a vacuum insulating glass (IG) unit. More particularly, this invention relates to a vacuum IG unit having a plurality of micro-sized spacers disposed between opposing substrates so as to form a low pressure space therebetween.

RELATED APPLICATIONS

Commonly owned U.S. Ser. No. 09/348,281 entitled "PERIPHERAL SEAL FOR VACUUM IG WINDOW UNIT" filed Jul. 7, 1999 pending; U.S. Ser. No. 09/303,550 entitled "VACUUM IG PILLAR WITH DLC COATING" filed May 3, 1999; U.S. Ser. No. 09/404,659 filed Sep. 24, 1999 entitled "VACUUM IG WINDOW UNIT WITH PERIPHERAL SEAL AT LEAST PARTIALLY DIFFUSED AT TEMPER" pending; and U.S. Ser. No. 09/440,697 filed Nov. 16, 1999 entitled "VACUUM IG WINDOW UNIT WITH FIBER SPACERS" pending, are all hereby incorporated herein by reference.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space 16 therebetween. Glass sheets 2 and 3 are interconnected by peripheral or edge seal of fused solder glass 4 and have an array of support spacers/pillars 5 therebetween.

Pump out tube 8 is sealed by solder glass 9 to an aperture or hole which passes from an interior surface of glass sheet 2 to the bottom of recess 11. A vacuum is attached to tube 8 (prior to the tube being sealed) so that the interior space 16 between sheets 2 and 3 can be evacuated to create a low pressure area. After evacuation, an end of tube 8 is melted to seal the vacuum in space 16. Optionally, getter 12 may be provided within recess 13 to counteract any rise in pressure due to any out-gassing from the glass.

FIG. 3 is a side cross sectional view of another conventional vacuum IG window unit. This unit differs from the FIGS. 1–2 unit, in that its glass sheets are of different sizes so as to provide an L-shaped step around the unit's periphery, on which edge seal 4 is to be at least partially located. Moreover, this unit includes low-E coating 6 on the interior major surface of glass sheet 3.

Conventional vacuum IG units, with their fused solder glass peripheral seals 4, have been manufactured as follows. Solder glass for seal 4 is initially deposited around the periphery of the unit. The entire assembly, including sheets 2, 3 and the solder glass material, is then heated to a temperature of approximately 500 degrees C. at which the solder glass melts, wets the surfaces of the glass sheets, and flows by capillary action into the space between the sheets so as to form hermetic peripheral/edge seal 4. After formation of seal 4, the assembly is cooled to room temperature.

Unfortunately, many conventional vacuum IG window units are aesthetically nonpleasing due to the presence of large spacers/pillars 5 which are visible to a viewer looking through the window unit. In such window units, large visible spacers in the middle of the viewing area may represent an eyesore.

It is apparent from the above that there exists a need in the art for a vacuum IG unit, and corresponding method of making the same, in which the unit is aesthetically pleasing to view. There also exists a need in the art for a VIG unit including spacers/pillars which are difficult to see with the naked eye at a normal distance from the unit (e.g., two to three feet away) where one would typically stand when looking through the window unit, while also being strong enough to maintain the space between the opposing substrates.

This invention will now be described with respect to certain embodiments thereof, accompanied by certain illustrations.

SUMMARY OF THE INVENTION

An object of this invention is to provide a vacuum IG window unit including spacers which are difficult to see with the naked eye by one looking through the window unit at a normal viewing distance.

Another object of this invention is to provide spacers for a vacuum IG window unit which may be made sufficiently small so as to be visibly unobtrusive and yet still be strong enough to support the substrates against atmospheric pressure in order to maintain the low pressure space therebetween.

Another object of this invention is to provide a vacuum IG window unit including single crystal spacers disposed between the opposing substrates.

Another object of this invention is to provide a vacuum IG unit including single crystal alumina platelet spacers disposed between the opposing substrates.

Another object of this invention is to fulfill any and/or all of the above-listed objects and/or needs.

Generally speaking, this invention fulfills any or all of the above described objects or needs by providing a thermally insulating glass panel comprising:

first and second spaced apart glass substrates defining a low pressure space therebetween having a pressure less than atmospheric pressure;

a plurality of spacers disposed between the first and second glass substrates for spacing the substrates from one another in order to maintain the low pressure space therebetween; and wherein at least one of the spacers is a single crystal structure having a maximum thickness of from about 10 to 100 $\mu$m.

This invention further fulfills any or all of the above-described needs or objects by providing a thermally insulating panel comprising:

first and second spaced apart substrates defining a space therebetween; and at least one spacer consisting essentially of a single crystal structure provided between the substrates in order to space the substrates from one another.

This invention still further fulfills any or all of the above described needs or objects by providing a thermally insulating glass panel comprising:

first and second spaced apart glass substrates defining a low pressure space therebetween having a pressure less than atmospheric pressure;

a plurality of spacers disposed between the first and second glass substrates for spacing the substrates from one another in order to maintain the low pressure space therebetween; and wherein at least one of the spacers includes first and second approximately parallel major flat surfaces for supporting the first and second substrates, respectively, a vertically extending peripheral surface extending in a direction approximately perpendicular to planes defined by the first and second major flat surfaces, and a first slanted surface extending between the vertically extending peripheral surface and the first major flat surface.

IN THE DRAWINGS

DETAILED DESCRIPTION OF CERTAIN EMBODIMENTS OF THIS INVENTION

Figure 2:
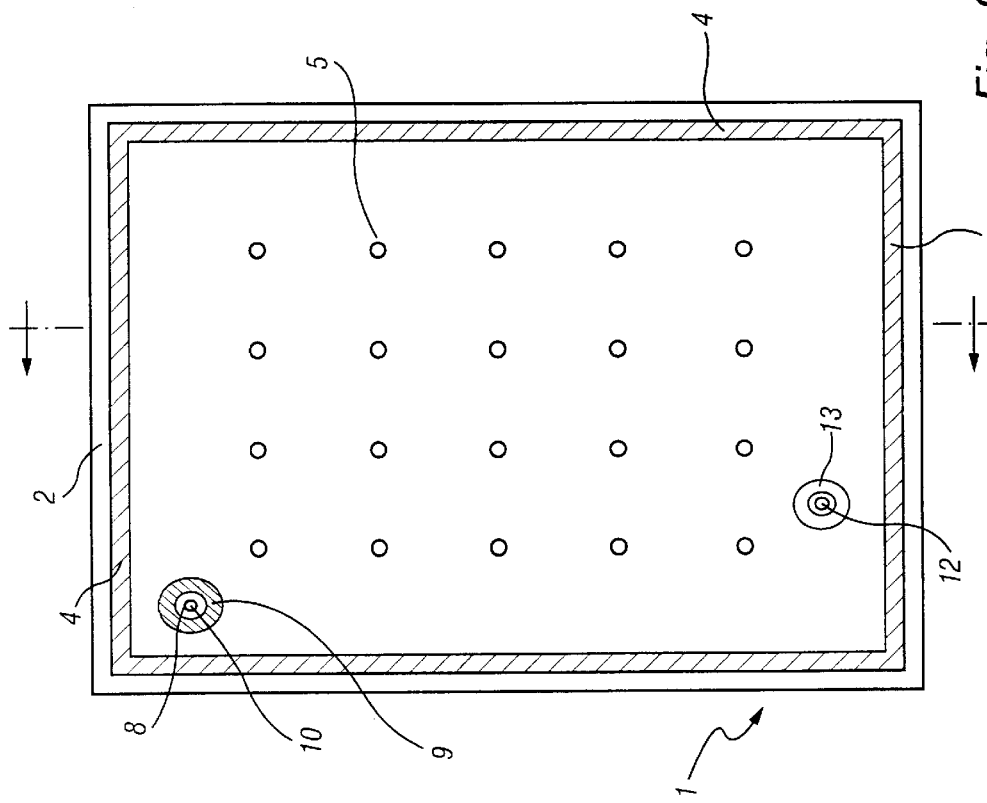
FIG. 2 is a top partial cross-sectional view of the FIG. 1 vacuum IG unit, absent the top glass substrate.

Referring now more particularly to the accompanying drawings in which like reference numerals indicate like parts throughout the several views.

Certain embodiments of this invention relate to micro-sized spacers for use in a vacuum IG window unit. The spacers disclosed herein are small enough in size so as to be visibly unobtrusive to a viewer looking through the window unit, yet strong enough to maintain the low pressure space between the opposing substrates.

Herein, edges of opposing vacuum IG substrates are hermetically sealed by at least one edge or peripheral seal 4. As can be seen in the drawings, "peripheral" and "edge" seals herein do not mean that the seal(s) are located at the absolute periphery or edge of the unit, but instead mean that the seal is at least partially located at or near (e.g., within about two inches of) an edge of at least one substrate of the unit.

Figure 1:
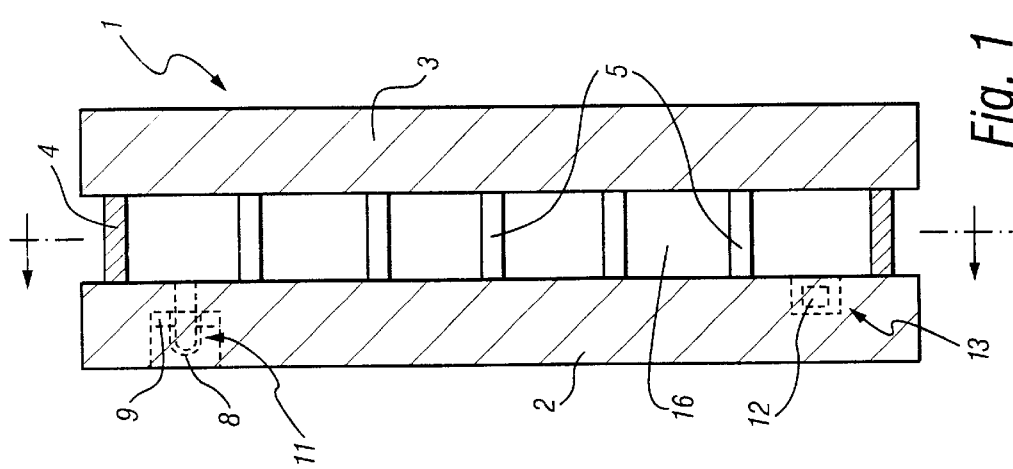
FIG. 1 is a prior art side partial cross-sectional view of a conventional vacuum IG window unit.
Figure 4:
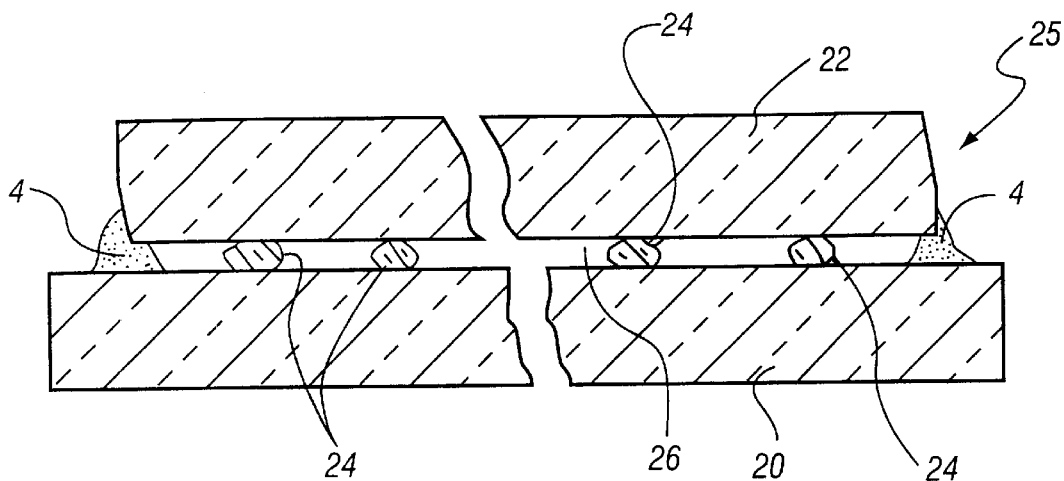
FIG. 4 is a side cross-sectional view of a vacuum IG window unit including a plurality of single crystal micro-sized spacers according to an embodiment of this invention.

FIG. 4 illustrates an exemplary vacuum IG window unit according to an embodiment of this invention. The vacuum IG window unit includes first and second opposing glass substrates 20 and 22 (tempered or non-tempered) which are spaced from one another by spacers or pillars 24 which maintain low pressure space 26 between the substrates. In certain preferred embodiments, substrates 20 and 22 are soda-lime-silica float glass. Hermetic peripheral or edge seal 4, provided between the substrates 20 and 22, seals off low pressure space 26 from surrounding atmospheric pressure. The peripheral/edge seal may be located entirely between the opposing substrates, as shown in FIG. 1. However, as shown in FIG. 4, the peripheral/edge seal 4 may instead be located partially between substrates 20 and 22, and partially in L-shaped step area 25 at the periphery of the unit. L-shaped step 25 is provided due to substrate 22 being smaller in size than substrate 20.

Figure 3:
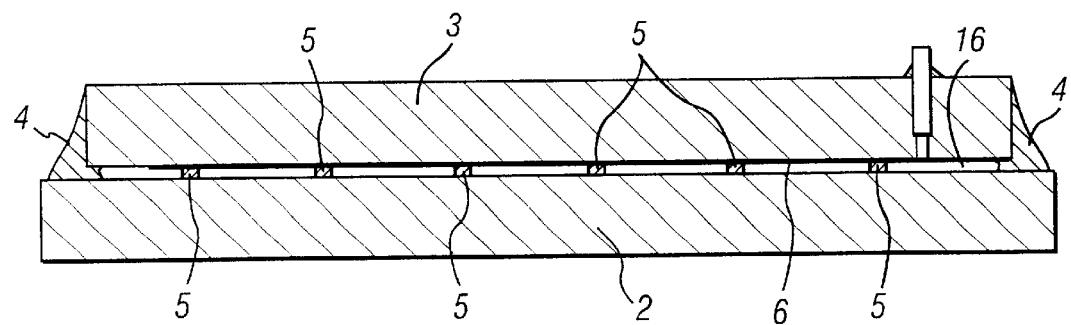
FIG. 3 is a side cross-sectional view of another conventional vacuum IG window unit.

Vacuum IG units according to different embodiments of this invention may be used as residential or commercial windows. The evacuation of space 26 eliminates or reduces heat transport between glass substrates 20 and 22 due to gaseous conduction and convection. In addition, radiative heat transport between substrates 20 and 22 can be reduced to a low level by providing a low emittance (low-E) coating (s) on a surface of one or both of sheets 20, 22 (e.g., see FIG. 3). High levels of thermal insulation can thus be achieved. Low gaseous thermal conduction may be achieved when the pressure in space 26 is reduced to a level e.g., equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system 4, including one or more edge seals, substantially eliminates any ingress or outgress of gas or air to/from low pressure space 26.

Referring to FIG. 4, an array of spacers or pillars 24 is provided between substrates 20 and 22 in order to maintain separation of the two approximately parallel glass sheets against atmospheric pressure. In certain embodiments, all spacers 24 are of approximately the same size and/or material. However, in other embodiments, there may be different sizes of spacers 24 in the same vacuum IG unit. In certain embodiments, the density of spacers (i.e., the number of spacers per unit area) may be greater in certain areas than in other areas, or alternatively, the density of the spacers may be approximately uniform throughout the entire unit.

Figures 5, 6:
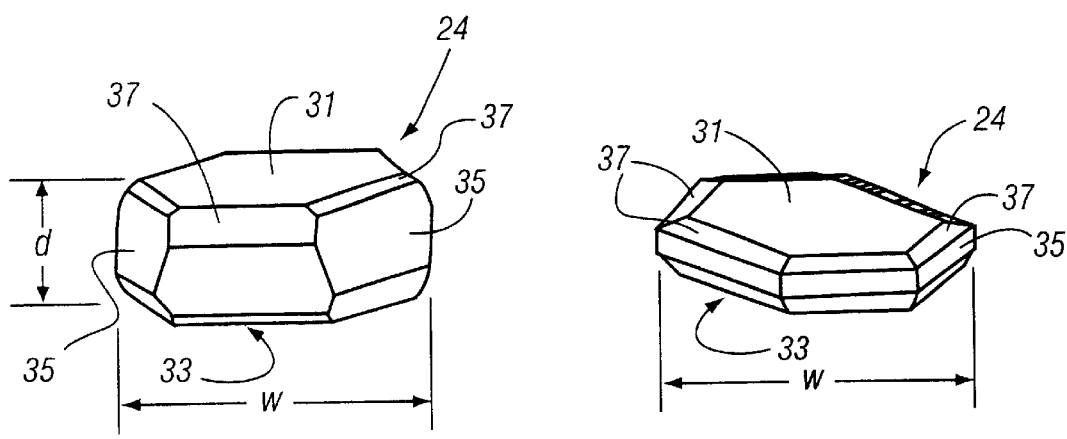
FIG. 5 is a perspective view of a single crystal hexagonal alumina platelet spacer which may be used in any of the vacuum IG units disclosed herein according to an embodiment of this invention.
FIG. 6 is a perspective view of another single crystal hexagonal alumina platelet spacer which may be used in any of the vacuum IG units disclosed herein according to another embodiment of this invention.

FIGS. 5–6 illustrate two different single crystal hexagonal alumina platelets which may be used as spacers 24 in any of the vacuum IG window units described or illustrated herein. The use of single crystal spacers 24 enables the spacers to be sized small enough so that they are visibly unobtrusive, while still having sufficient strength to maintain the low pressure space between the opposing substrates against atmospheric pressure.

In certain embodiments of this invention, spacers 24 have a maximum thickness or height ("d" in FIG. 5) of from about 10 to 100 $\mu$m, more preferably from about 10 to 50 $\mu$m, and most preferably from about 10 to 30 $\mu$m. This thickness of spacers 24 enables the low pressure space (which is of corresponding distance "d") between the opposing substrates to be at least 10 $\mu$m thick, which reduces the likelihood of infrared (IR) heat/radiation easily transferring from one substrate to the other across the gap.

As illustrated in FIGS. 5–6, each spacer 24 may be shaped in the form of a platelet in certain preferred embodiments of this invention, which enables the spacers to be easily deposited in an appropriate fashion on one of the substrates during the manufacturing process. Such a shape also enables a small spacer to be strong enough to support the opposing substrates against atmospheric pressure. Spacers 24 are of thickness "d", and of diameter or width "w." The width "w" of each spacer in certain embodiments of this invention is from about 10 to 150 $\mu$m, more preferably from about 20 to 100 $\mu$m, and most preferably from about 30 to 80 $\mu$m. Accordingly, in preferred embodiments, "w" is greater than "d." For example, the ration w:d is from about 2:1 to 10:1 in certain embodiments of this invention, more preferably from about 3:1 to 6:1. When the spacers are single crystal spacers, the appropriate crystal size is chosen in accordance with the desired application (the aspect ratio may range from about 5–50 in different embodiments).

Figure 7:
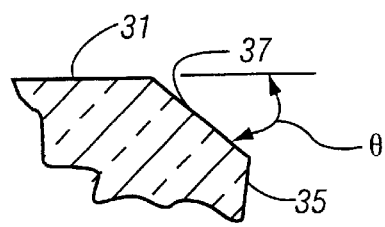
FIG. 7 is a cross sectional view of a portion of a spacer, illustrating how a slanted surface is angled relative to its adjacent major flat surface.

Each spacer 24 includes flat upper and lower approximately parallel major surfaces 31 and 33, respectively, for contacting and/or supporting the interior surfaces of the opposing substrates. Moreover, each spacer 24 includes vertically extending flat peripheral edge portion(s) 35, and angled or slanted connecting surfaces 37 which extend between the respective major surfaces and vertical edge portion(s) 35. As illustrated in FIG. 7, the first and second slanted surfaces 37 are angled relative to their adjacent major surfaces at an angle θ of from about 10 to 45 degrees, more preferably of from about 20 to 35 degrees.

In certain preferred embodiments, spacers 24 consist essentially of a single monocrystalline alpha $Al_2O_3$ hexagonal shaped crystal as illustrated in FIGS. 5–6. Such spacers 24 may be in the form of a platelet as illustrated, have a Knoop-2000 hardness, a pH of from about 9.0 to 10.5, and a specific gravity of from about 3.8 to 4.1 g/cc, most preferably about 3.95 g/cc. In certain embodiments, single crystals 24 may be of calcined $Al_2O_3$. Such spacers 24 consisting essentially of $Al_2O_3$ include at least about 95% $Al_2O_3$, and most preferably at least about 98.5% $Al_2O_3$; with the remainder of the single crystal structure composed of small amounts of, e.g., $SiO_2$, $Fe_2O_3$, $TiO_2$, CaO, MgO, and/or $Na_2O$. For example, in one exemplary embodiment, spacer 24 consists essentially of $Al_2O_3$, this spacer being a monocrystalline alumina hexagonally shaped single crystal of at least 98.70% $Al_2O_3$, the remainder of the single crystal spacer structure including from about 0.0–0.06% $SiO_2$, from about 0.0–0.03% $Fe_2O_3$, from about 0.0–0.02% $TiO_2$, from about 0.0–0.07% CaO, from about 0.0–0.05% MgO, and from about 0.0–1.00% $Na_2O$. These percentages are by weight.

While FIGS. 5–6 illustrate spacer 24 being a single hexagonally shaped alumina crystal in the form of a platelet, spacers 24 herein according to other embodiments of this invention may be of other materials. For example, spacers 24 may be primarily of, or consist essentially of, alumina as described above, or may instead comprise, or consist essentially of, MgO and/or gypsum ($CaSO_4$— $2H_2O$). Each of these natural materials may take the form of a tabular single crystal (e.g., similar to those shown in FIGS. 5–6) which may be sieved to the desired particle size (preferably less than about 37 μm). The materials which most easily form such natural tabular crystals (i.e., approximately flat on the upper and lower major surfaces with w>d) are oxides and hydroxides, sulfides and sulfates, carbonates and silicates, in particular phyllosilicates, where elements in Groups IA, IIA, IIIA, and IVA are included in these compound structures. The single crystal spacers herein are preferably made of these materials.

While the spacers 24 illustrated in FIGS. 5–6 are hexagonal in shape, it will be appreciated by those skilled in the art that other shapes of tabular spacers may instead be used according to different embodiments of this invention. For example, spacers 24 may instead be tetragonal, orthohombic, triclinic, or monoclinic. In certain embodiments of this invention, spacers herein may be made of a material which will also enable the spacer(s) to function as a getter between the substrates. In this regard, the entire disclosure of commonly owned U.S. Ser. No. 09/376,321 is hereby incorporated herein by reference, in which getter/pillars are described.

In certain embodiments of this invention, peripheral or edge seal 4 may be made of or include solder glass, indium, or an alkali silicate (e.g. sodium silicate, potassium silicate, etc.). When the edge seal material is of or includes an alkali silicate, the material for seal 4 is initially deposited or otherwise provided on one or both of substrates 20, 22 (e.g. on step 25) in an aqueous solution form such as a quasi-liquid or syrup at a location proximate to where the seal is to be formed. Thereafter, the two substrates 20, 22 along with the material for seal 4 are together heated to a curing temperature no greater than about 300° C. (more preferably no greater than about 225° C., and most preferably no greater than about 150° C.) for a period of time of from about 0.25 to 5.0 hours so as to allow the water of the solution to evaporate thereby causing the seal material to cure or crystallize into solid hermetic peripheral/edge seal 4. When the substrates with silicate seal material therebetween are heated, water evaporation from the seal material occurs at a substantial rate at temperatures greater than or equal to about 100 degrees C. In certain embodiments, an additional edge seal(s) (i.e. one or more additional seals) may be provided in order to protect the silicate inclusive edge seal from weather effects.

In certain preferred embodiments, peripheral/edge seal 4 may be of or include $Na_2O$—$MSiO_2$ (i.e. a form of sodium silicate) or alternatively may be of or include $K_2O$—$MSiO_2$ (i.e. a form of potassium silicate), where "M" represents a modulus of glass and may be from about 1.0 to 5.0 (more preferably from about 2.5 to 3.5, and most preferably about 3.0). In other words, with reference to $Na_2O$—$MSiO_2$ for example, the ratio by weight of $Na_2O$:$SiO_2$ (sodium oxide to silica ratio) may be from about 1:1 to about 1:5, more preferably from about 1:2.5 to 1:3.5, and most preferably about 1:3.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A thermally insulating glass panel comprising:

first and second spaced apart glass substrates defining a low pressure space therebetween having a pressure less than atmospheric pressure;

a plurality of spacers disposed between said first and second glass substrates for spacing said substrates from one another in order to maintain said low pressure space therebetween; and wherein at least one of said spacers is a single crystal structure having a maximum thickness of from about 10 to 100 μm.

2. The glass panel of claim 1, wherein said at least one spacer has a maximum thickness of from about 10 to 50 μm, and has a width (w) to maximum thickness (d) ratio of from about 2:1 to 10:1.

3. The glass panel of claim 1, wherein said at least one spacer has a maximum thickness of from about 10 to 30 μm, and wherein said spacer is approximately hexagonal in shape.

4. The glass panel of claim 3, wherein said at least one spacer is shaped in a manner so as to include first and second approximately parallel major surfaces which support respective interior surfaces of the first and second substrates.

5. The glass panel of claim 1, wherein said at least one spacer comprises at least about 95% $Al_2O_3$.

6. The glass panel of claim 1, wherein said at least one spacer comprises at least about 98.5% $Al_2O_3$.

7. The glass panel of claim 1, wherein said at least one spacer consists essentially of $Al_2O_3$, and has a width (w) to maximum thickness (d) ratio of from about 2:1 to 10:1.

* * * * *